United States Patent
Schmitt

(10) Patent No.: US 7,416,263 B2
(45) Date of Patent: Aug. 26, 2008

(54) METHOD AND DEVICE FOR IMPROVING PRESSURE BUILD-UP DYNAMICS

(75) Inventor: Johannes Schmitt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 10/489,526

(22) PCT Filed: Sep. 7, 2002

(86) PCT No.: PCT/DE02/03335

§ 371 (c)(1),
(2), (4) Date: Sep. 14, 2004

(87) PCT Pub. No.: WO03/024758

PCT Pub. Date: Mar. 27, 2003

(65) Prior Publication Data

US 2005/0017579 A1    Jan. 27, 2005

(30) Foreign Application Priority Data

Sep. 12, 2001    (DE) ............................. 101 44 879

(51) Int. Cl.
 *B60T 8/60* (2006.01)
(52) U.S. Cl. ........................... 303/146; 303/11
(58) Field of Classification Search .............. 303/10, 303/11, 155, 139, 140, 146
See application file for complete search history.

(56) References Cited

U.S. PATENT DOCUMENTS

| 5,605,384 | A | * | 2/1997 | Johnston et al. | 303/113.1 |
| 5,636,907 | A | * | 6/1997 | Okazaki et al. | 303/10 |
| 5,797,663 | A | * | 8/1998 | Kawaguchi et al. | 303/146 |
| 5,918,948 | A | * | 7/1999 | Burgdorf et al. | 303/113.2 |
| 5,967,624 | A | * | 10/1999 | Graber et al. | 303/113.4 |
| 6,219,610 | B1 | * | 4/2001 | Araki | 701/72 |
| 6,273,525 | B1 | * | 8/2001 | Erban et al. | 303/11 |

FOREIGN PATENT DOCUMENTS

| DE | 40 37 468 | 5/1992 |
| DE | 195 47 111 | 6/1997 |
| DE | 196 15 294 | 10/1997 |
| EP | 1 081 004 | 3/2001 |

OTHER PUBLICATIONS

"Driving Safety Systems (2. edition, 1998, ISBN No. 3-528-03875-6)." pp. 206-207.
"Kraftfahrtechnisches Taschenbuch" (Motor Vehicle Technical Pocket Book). 23. edition, ISBN No. 3-528-03876-4, pp. 654-655).

\* cited by examiner

*Primary Examiner*—Bradley T King
(74) *Attorney, Agent, or Firm*—Kenyon & Kenyon LLP

(57) ABSTRACT

The present invention relates to a device and method for controlling the braking system of a vehicle equipped with a wheel slip control system. In this context, the wheel slip control system is in a position, when certain conditions are met, to initiate the buildup of first braking torques at least one wheel brake. Furthermore, the wheel slip control system initiates preparatory measures for the buildup of second braking moments in the wheel brakes of the remaining wheels, the preparatory measures leading to no, or no significant, braking action in the wheel brakes of the remaining wheels. The present invention provides the preparatory measures for the buildup of second braking moments in reaction to the buildup of the first braking moments.

7 Claims, 7 Drawing Sheets

METHOD AND DEVICE FOR IMPROVING PRESSURE BUILD-UP DYNAMICS

FIELD OF THE INVENTION

The present invention relates to a method and a device for controlling the braking system of a vehicle, and relates particularly to a method and device for improving pressure build-up dynamics.

BACKGROUND INFORMATION

German published patent document DE 196 15 294 discloses a device and a method for controlling the braking power at least one wheel of a vehicle, which device includes the following means: Means for ascertaining a criterion that describes and/or influences the vehicle's motion, means for ascertaining the size and the means describing the wheel dynamics of the respective wheel, using which, as a function of the ascertained criterion describing and/or influencing the vehicle motion, it is determined whether a braking operation independent of the driver at one wheel is foreseeable. Furthermore, the device includes means using which, upon the presence of the requirement of a foreseeable driver-independent braking operation, a slight actuation of variable duration of the actuators allocated to the wheel is able to be carried out, ahead in time of this foreseeable, driver-independent braking operation. In this context, the duration of the slight actuation of the actuators is ascertained at least as a function of the quantity describing the wheel dynamics of the appertaining wheel.

German published patent document DE 195 47 111 discloses a method and a device for controlling the braking system of a vehicle, in which, even before the beginning of a wheel slip control system, pressure is applied to the wheel brakes if predefined conditions exist, with no significant braking effect being applied to the drive wheels.

Driving Safety Systems, pp. 206-207 ($2^{nd}$ ed., 1998) (ISBN no. 3-528-03875-6), discusses a change among braking interventions at various wheels.

Kraftfahrtechnisches Taschenbuch (Motor Vehicle Technical Pocket Book), pp. 654-655 ($23^{rd}$ ed.) (ISBN no. 3-528-03876-4), discusses a braking system that has two brake circuits: one that extends over the front wheels, and another that extends over the rear wheels.

SUMMARY

In the context of controlling the braking system of a vehicle equipped with a wheel slip control system, the wheel slip control system is in a position,
- as a result of the fulfillment of given conditions, to initiate the buildup of first braking torques at least one wheel brake in the corresponding wheel, and
- to initiate preparatory measures for the buildup of second braking moments in the wheel brakes of the remaining wheels, the preparatory measures not leading to any, or to any significant, braking action in the wheel brakes of the remaining wheels.

The preparatory measures may be undertaken for the buildup of second braking moments in reaction to the buildup of the first braking moments.

The danger of an unnecessary braking activation is lessened by the fact that the preparatory measures for the buildup of second braking moments are built up only after the initiation of the buildup of the first braking moments. This leads, additionally, to prevention of unnecessary loading of the components, and less wear of the components of the brake circuit.

The present invention may be applied in a situation where the wheel slip control system is a driving dynamics control system. In a driving dynamics control that is in use and is carrying out brake activations, between two operations at different brakes there is a time span in the order of magnitude of 200 milliseconds. Thus, as soon as the driving dynamics control first intervenes at one wheel, a time span in the order of magnitude of 200 milliseconds is available for the buildup of the second braking moments in the remaining wheels. This time duration is sufficient for building up second braking moments at the wheels not yet affected by the intervention of the driving dynamics control, which, however, do not yet lead to any, or to any significant, braking action. These second braking moments are so big, in the ideal case, that the clearance of the brake, i.e. the distance between the brake pad and the brake disk, just vanishes. In this case, each further increase of the brake pressure leads to an immediate braking action.

The present invention is also advantageous in conditions at whose fulfillment the vehicle gets into a potentially dangerous state with respect to driving stability. In this case, the initiation of the preparatory measures for the buildup of the second braking moments leads to a greater stability.

The first braking moments may be selected by the driving dynamics regulating system right away in such a way that they act in a manner stabilizing travel.

As a result of the preparatory measures for the buildup of second braking moments, the brake linings are brought as close as possible to the respective brake disk. It is evident that thereby an especially rapid braking may be initiated at these wheels too.

In case the vehicle has two separate hydraulic braking circuits, the preparatory measures for the buildup of second braking moments in the braking circuit in which no, or no significant, first braking moments is built up as a result of the presence of first conditions, may, among other things, be constituted in such a way that:
- the return pump, provided that it is not already in operation, is put into operation,
- the inlet valves of the wheel brakes, provided they are not already at this setting, are brought to the pass-through setting,
- the discharge valves of the wheel brakes, provided they are not already at this setting, are brought to the blocking setting,
- the switchover valve, provided it is not already at this position, is brought into the pass-through position, and
- the high pressure switching valve, provided it is not already at this position, is brought into the pass-through position.

In this context, it is assumed that each of the two brake circuits has available to it:
- a switchover valve which is in the blocking position when there is a braking intervention not caused by the driver, and
- a high pressure switching valve which is in the pass-through setting if a braking intervention is to be carried out in the brake circuit by activation of the return pump.

The components mentioned are present in modern vehicles, which are equipped, for example, with a driving dynamics control system. Therefore, advantageously, no additional, substantial material expenditure is necessary.

One advantageous application for the present invention comes about if the vehicle, besides having a wheel slip control system, also has a system for environmental sensor technology, which, by using the evaluation of the signals delivered by the environmental sensor technology, is in a position to carry out speed regulation and ranging for the vehicle, and the signal delivered by the environmental sensor technology enter into the testing as to whether the given conditions are satisfied. This makes possible a more rapid reaction of a system to automatic travel-speed regulation and ranging (e.g., ACC (automatic cruise control)) in the case of obstacles and other vehicles spotted by the sensor technology.

The system for the environmental sensor technology may be implemented with radar, lidar or video.

DETAILED DESCRIPTION

In accordance with the present invention, a vehicle equipped with a wheel slip control system and a braking system is under consideration. In this connection, the braking system may be, for instance, a hydraulic braking system, a pneumatic braking system, an electropneumatic braking system (EPB), an electrohydraulic braking system (EHB) or an electromechanical braking system (EMB).

Figure 1:
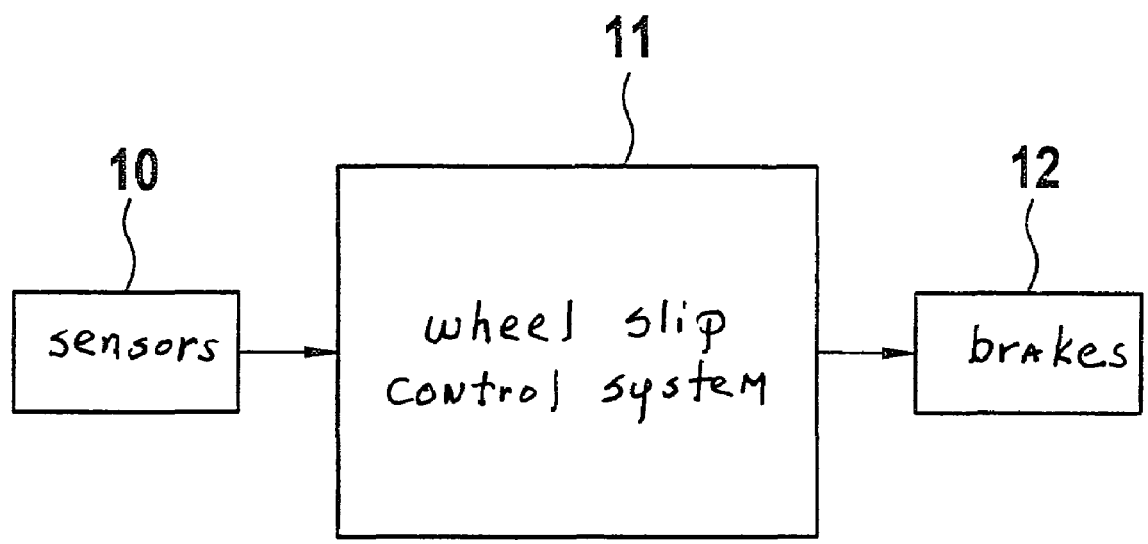
FIG. 1 shows a block diagram of the structure of the device according to the present invention.

FIG. 1 shows a block diagram of the device according to the present invention. In it, sensors 10 send signals to wheel slip control system 11. The output signals of block 11 go to brakes 12.

Sensors 10 may be, for example, sensors from the area of driving dynamics control. In this connection, one might name, for instance, steering angle sensors, wheel speed sensors, transverse acceleration sensors or yaw rate sensors.

The sensors might, for example, also involve sensors from the field of environmental sensor technology for adaptive speed control and ranging. The sensors may also be suitable for processing radar signals, lidar signals or video takes.

In wheel slip control system 11, it is checked whether predefined conditions have been satisfied.

These conditions may relate, for example, to the following points:

1. steering angle or steering angle gradient;

2. transverse acceleration or transverse acceleration gradient;

3. driving dynamics measured variables such as wheel speeds, wheel accelerations, slip, yaw rate, etc.;

4. an approaching obstacle detected by the radar signal;

5. an approaching curve ascertained by navigation; and 6. braking pressure or braking pressure gradient, the high pressure switching valve not, or not yet being switched.

If the wheel slip control system is characterized as a driving dynamics control system, it may be checked, for example, whether the yaw rate of the vehicle is exceeding a threshold value. If exceeding of the threshold value is detected, first braking interventions are undertaken by the driving dynamics control system on the brakes selected by the driving dynamics control system, for reasons of travel safety. The first braking interventions usually act only upon selective wheels. However, during the course of a vehicle dynamics control process, frequently wheels at which braking interventions are being undertaken are changed.

Figure 2:
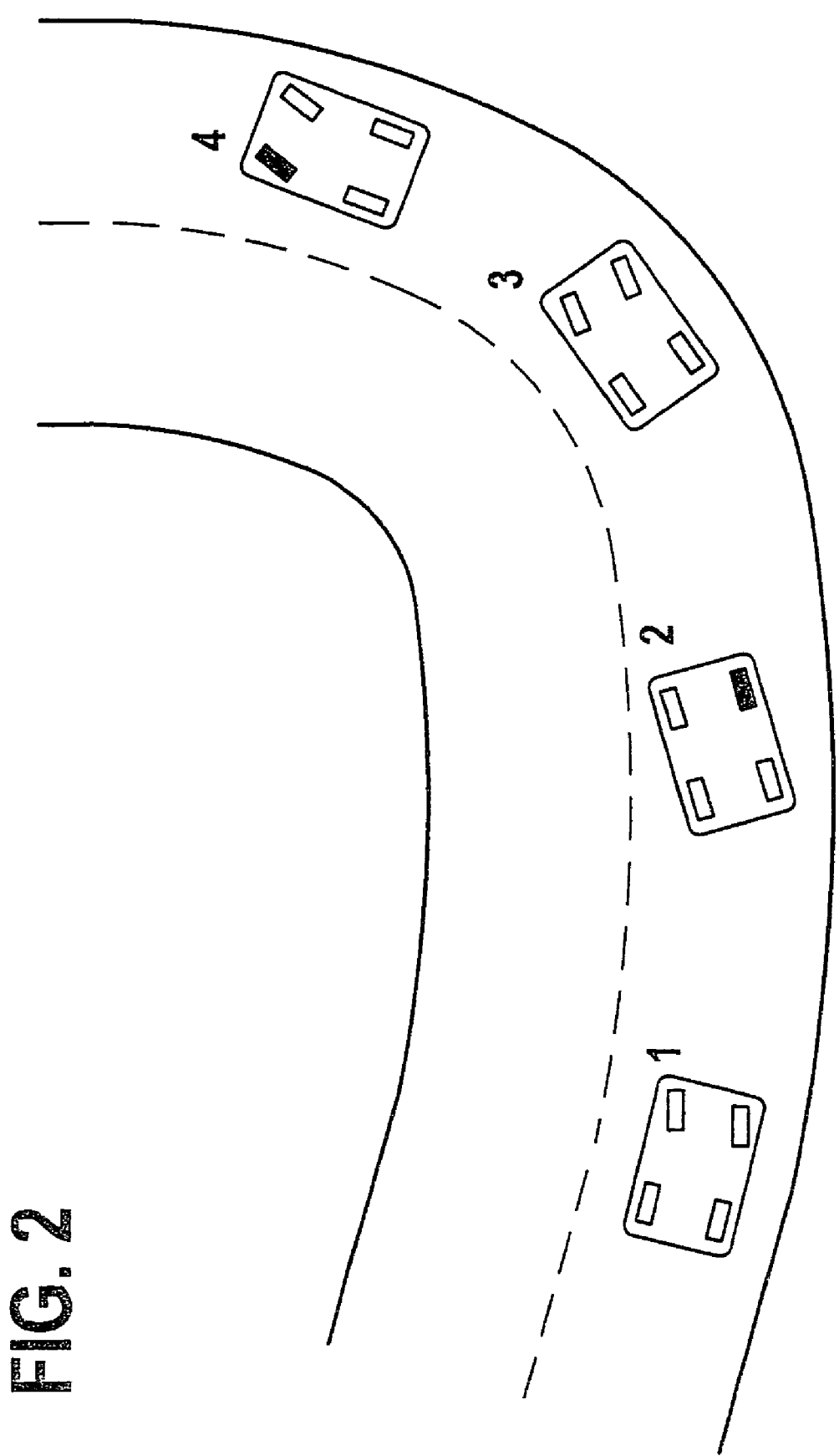
FIG. 2 shows a driving maneuver in which braking interventions are undertaken on two different wheels at different points in time.

FIG. 2 shows the essential points of this. The motor vehicle shown in FIG. 2 is equipped with a driving dynamics control system during travel through a curve to the left.

In state 1, the vehicle is shown entering into the left curve. The driver oversteers, and in state 2, there is a threat of instability. Therefore, in state 2, there is a braking intervention at the right front wheel. Thereby, the vehicle remains under control, as shown in state 3. A renewed, threatening instability is avoided in state 4 by a braking intervention at the left front wheel, which stabilizes the vehicle. The braked wheel is shown in FIG. 2 in black, in each case.

The brake at the right front wheel in FIG. 2 in state 2 corresponds to the first braking intervention. At those wheel brakes at which no first braking moments are generated, preparatory measures for a possible future braking are now taken. The purpose of these preparatory measures is that the additional brakes are put into a "brake-ready state" as much as possible. This is manifested in that the brake pads or brake linings are moved as close as possible to the brake disks. The distance between brake linings and brake disks is called clearance. Now, this clearance should be made as small as possible, but there should be no contact as yet between brake linings and brake disks. This procedure will be referred to below as "preloading of the wheel brakes". This now makes it possible to perform a braking more rapidly at a later point. It is immediately clear that in state 4 (see FIG. 2 once again) a more rapid braking of the left front wheel can be carried out if in state 2, during the braking of the right front wheel, the clearance was reduced in the remaining wheels.

Figure 3:
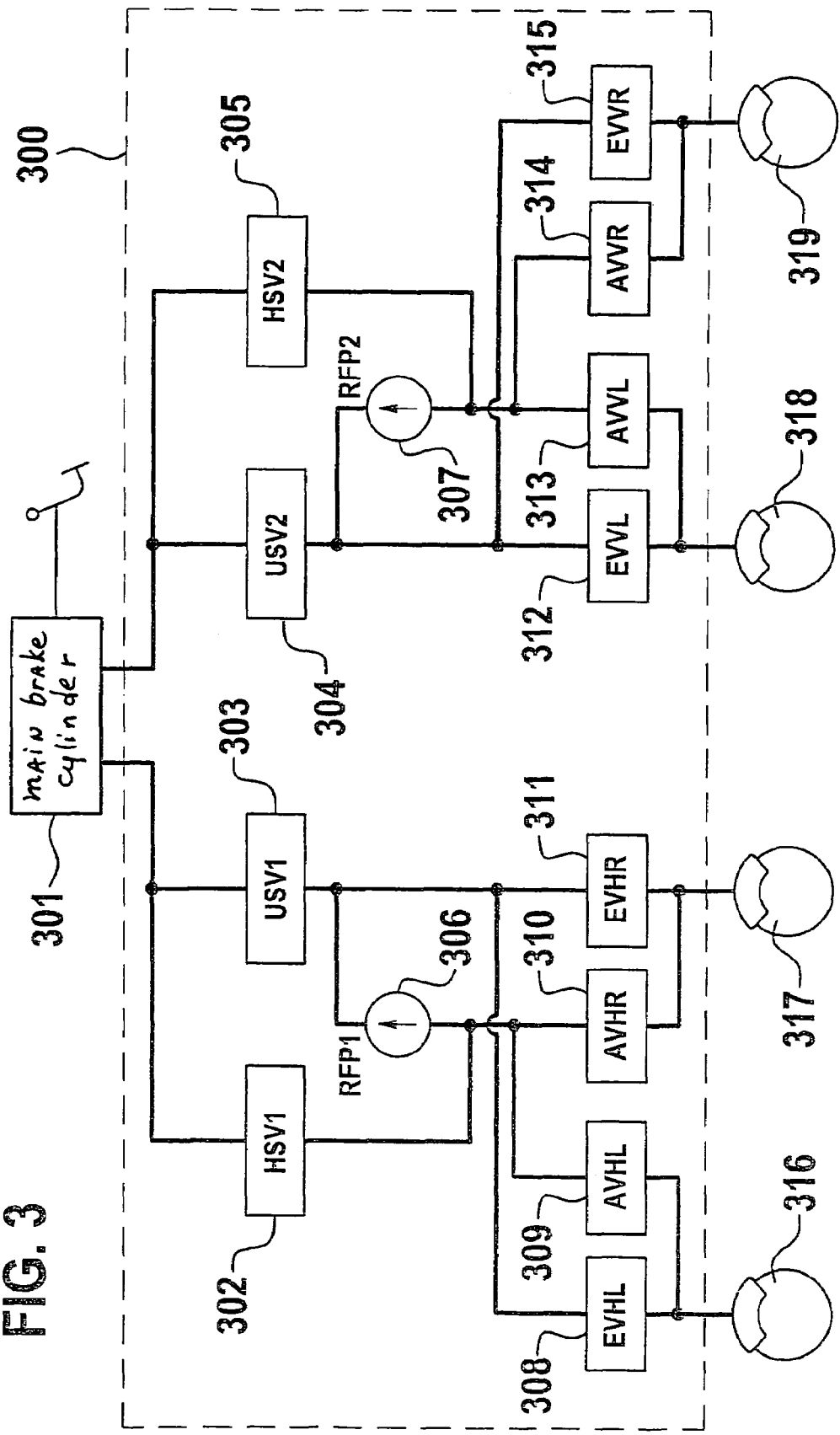
FIG. 3 shows a block diagram of the brake circuits of a vehicle equipped with a driving dynamics control system.

FIG. 3 shows a block diagram of the braking system of a vehicle equipped with a driving dynamics control system. In this context, all parts that were not essential for the understanding of the braking system were omitted. A braking system is discussed that has two brake circuits: the first circuit is the left branch in FIG. 3 (it is also denoted as a floating brake circuit), and the right branch is the second brake circuit (which is also denoted as a pressing rod brake circuit). In this context, the first brake circuit extends over the rear wheels and the second brake circuit extends over the front wheels. This distribution is also known as a II distribution. Of course, other distributions are also conceivable.

Before we go into details of the braking system, we first briefly introduce the individual blocks shown in FIG. 3:

300: Hydraulic brake pressure control device

301: main brake cylinder

302: HSV1 (=high pressure switching valve of first brake circuit)

303: USV1 (=switchover valve of first brake circuit)

306: RFP1 (=return pump of first brake circuit)

308: EVHL (=inlet valve rear left, i.e. at the brake of the left rear wheel)

309: AVHL (=discharge valve rear left)

311: EVHR (=inlet valve rear right)
310: AVHR (=discharge valve rear right)
316: wheel brake of left rear wheel
317: wheel brake of right rear wheel
305: HSV2 (=high pressure switching valve of second brake circuit)
304: USV2 (=switchover valve of second brake circuit)
307: RFP2 (=return pump of second brake circuit)
312: EVVL (=inlet valve front left)
313: AVVL (=discharge valve front left)
315: EVVR (=inlet valve front right)
314: AVVR (=discharge valve front right)
318: wheel brake of left front wheel
319: wheel brake of right front wheel The two return pumps are driven by a common motor, i.e. they are put in operation in parallel.

From main cylinder 301, two lines go to brake pressure control device 300. This brings about a branching to the two high pressure switching valves 302 and 305, and to switchover valves 303 and 304. High pressure switching valve 302 is connected to discharge valves 309 and 310, as well as to the suction side of return pump 306. Switchover valve 303 is connected to inlet valves 308 and 311, as well as to the delivery side of return pump 306. The output side of inlet valve 308 and the input side of discharge valve 309 are connected to wheel brake 316, and, in the same way, inlet valve 311 and discharge valve 310 are connected to wheel brake 317.

High pressure switching valve 305 is connected to discharge valves 313 and 314, as well as to the suction side of return pump 307. Switchover valve 304 is connected to inlet valves 312 and 315, as well as to the delivery side of return pump 307. The output side of inlet valve 312 and the input side of discharge valve 313 are connected to wheel brake 318, and, in the same way, inlet valve 315 and discharge valve 314 are connected to wheel brake 319.

Return pump 306 lies between switchover valve 303 (delivery side) and discharge valve 310 (suction side), and return pump 307 lies between switchover valve 304 (delivery side) and discharge valve 313 (suction side).

For illustration purposes, let us now look at a suddenly occurring, driving-dynamics-control intervention at the right rear wheel and corresponding wheel brake 317.

But first, let us explain the concepts "blocked" and "switched through":

A "blocking" valve does not permit any through flow of the brake fluid, and a "switched through" valve permits through flow of the brake fluid, in the ideal case without loss of pressure.

When the driving-dynamics-control intervention is applied, return pump 306 and return pump 307 go into operation. This is the assumption for carrying out a driver-independent brake intervention by the driving dynamics control system. However, no driver-independent braking intervention takes place. Therefore, in the main brake cylinder, the surrounding pressure is present, i.e. no braking pressure has been built up.

The arrows drawn into both pumps indicate the delivery direction. In the floating circuit (rear brake circuit) switchover valve 303 is blocked. High pressure switching valve 302 is switched through. Return pump 306 is connected on its suction side via the high pressure switching valve to the main brake cylinder, as well as to discharge valves 309 and 310. On its delivery side, the return pump now delivers brake fluid to wheel brake 317, via switched through inlet valve 311. A braking moment buildup takes place at the right rear wheel.

In the pressing rod brake circuit (front brake circuit), the return pump simultaneously also goes into operation. In this circuit, discharge valves 313 and 314 are blocked. Switchover control valve 304 and high pressure switching valve 305 are both switched through. Consequently, the brake fluid now circulates in the hydraulic circuit that consists of blocks 304, 305 and 307. Wheel brakes 318 and 319 of the front wheels are connected to the delivery side of return pump 307, via their switched through inlet valves 312 and 315. There, in the steady state after closing the circuit, a pressure of the order of magnitude of 3 bar is present. This pressure, denoted as ram pressure, is utilized for the preloading of wheel brakes 318 and 319.

In the floating circuit, the rear wheel, which is not in the driving dynamics control, can also be preloaded. Since, in this hydraulic circuit, switchover valve 303 is blocked, a higher pressure is present at inlet valves 311 and 308. That is why, at that place, there takes place in wheel brake 316 the buildup of a pressure that does not lead to a braking action, or rather, not lead to a significant braking action, by the brief switching through of inlet valve 308 and subsequent blocking. Discharge valve 309 may also be drawn upon for this regulation.

Figure 4:
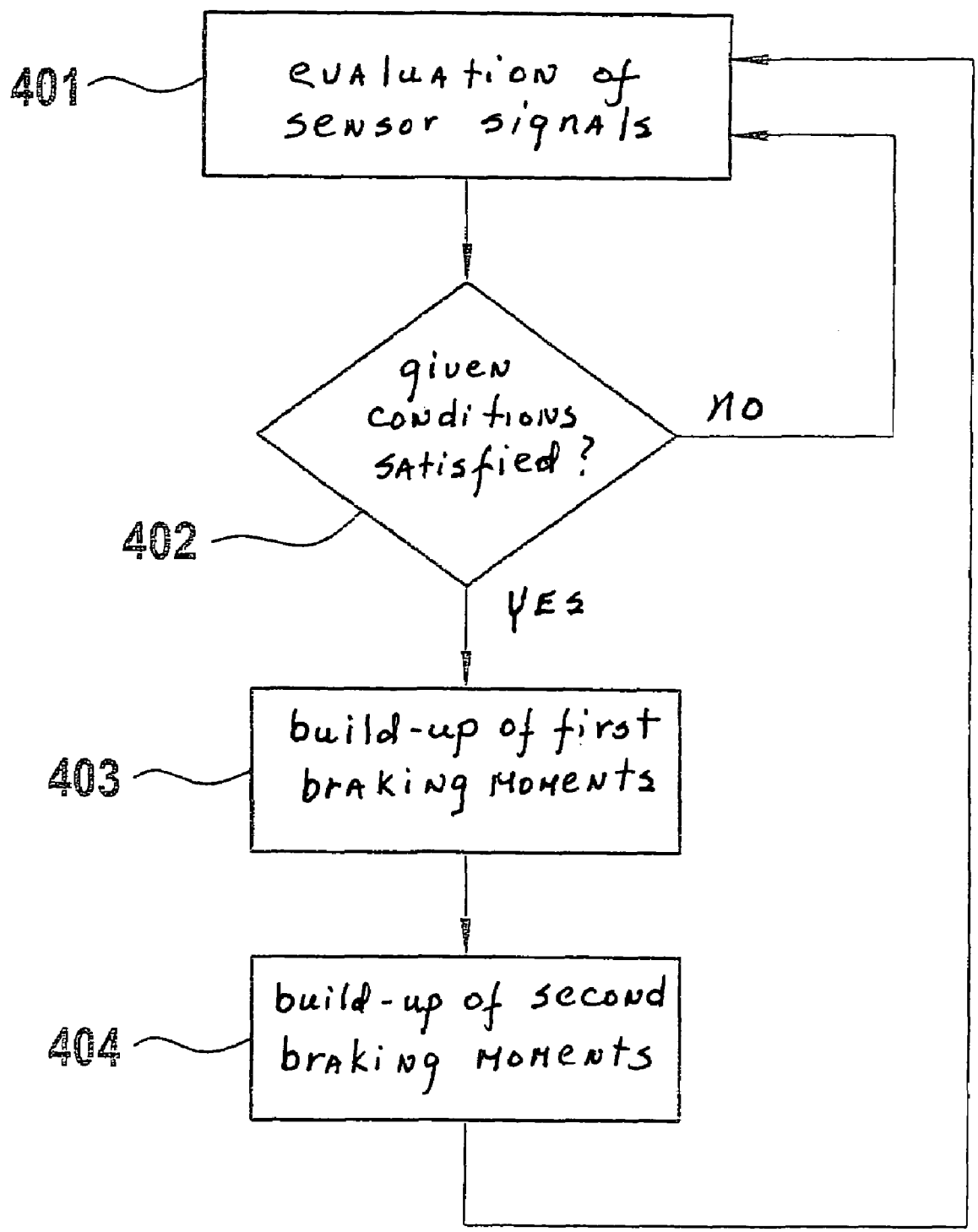
FIG. 4 shows a flowchart of an exemplary method according to the present invention for minimizing the danger of the pressure build-up dynamics.

FIG. 4 shows a flowchart of an exemplary sequence of the method according to the present invention.

An evaluation of sensor signals takes place in block 401.

In block 402 it is subsequently checked whether given conditions have been satisfied. If these conditions are not satisfied, the sensor signals are evaluated again at a later point in time. If the conditions are satisfied, there takes place in block 403, first of all, a buildup of first braking moments, and subsequently in block 404, a buildup of second braking moments. Thereafter, in block 401 the sensor signals are evaluated again.

It is possible that the preventive pressure buildup at the wheels that are not in the wheel slip control takes place only when certain conditions have been satisfied. These conditions may include:

1. Only at low temperatures. At low temperatures the brake fluid is more viscous, and consequently there is a slower braking moment buildup. In this situation a preloading of the wheel brakes is especially useful.

2. Only in a certain travel speed range.

3. Only for selected wheels. The selection of the wheels may depend, for example, on the travel direction.

4. Only for travel at great heights. The height can be ascertained, for example, from the engine control or barometrically.

5. Combinations of the conditions just mentioned above are also conceivable.

6. Of course, the principle of preloading of the brake linings is also applicable in the case of the electromechanical brake (EMB).

A measurement of the ram pressure by a pressure sensor that is in the hydraulic circuit is also possible. Consequently, a regulation of the ram pressure by evaluation of the measuring signals and the activation of the return pump is made possible. This can lead, for example, to a rotary speed regulation of the pump motor.

Figure 5:
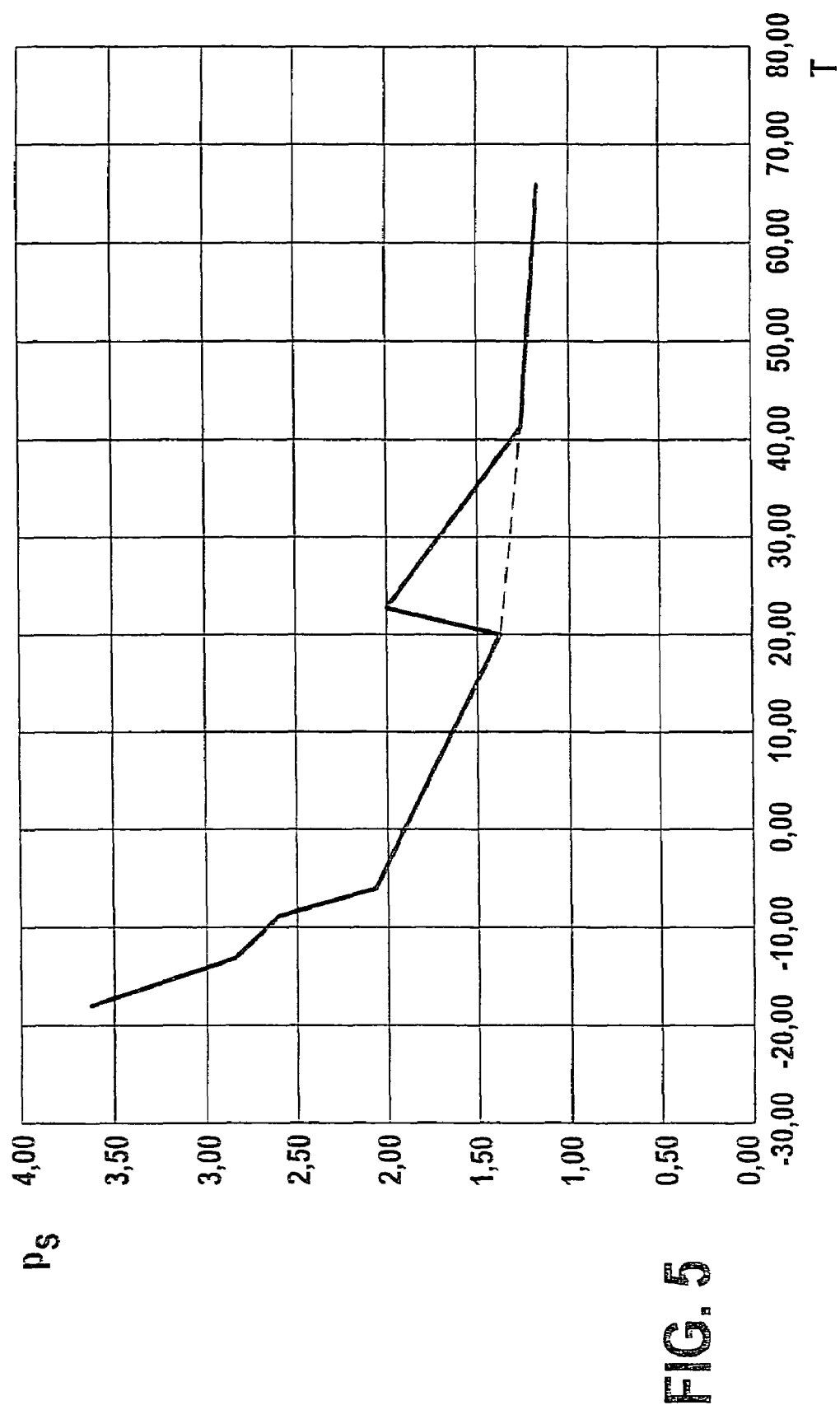
FIG. 5 is a chart showing the measured ram pressure as a function of the temperature of the brake fluid.

The ram pressure rises with falling temperature of the brake fluid. That is positive, since the pressure buildup dynamics improve on account of a higher ram pressure. FIG. 5 shows the measured ram pressure $p_s$ as a function of temperature T of the brake fluid.

Figure 6:
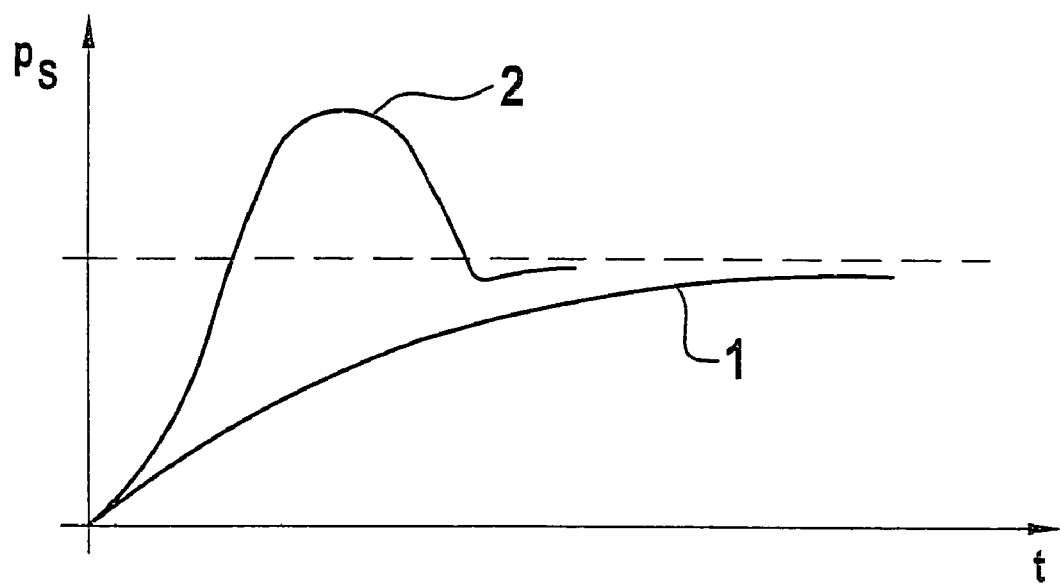
FIG. 6 is a chart showing the increase in the ram pressure as a function of time.

The possibility exists of speeding up the buildup of the ram pressure by briefly blocking the switchover valve. By the brief blocking of the switchover valve, a pressure pulse is put into the wheel brake cylinder. This pressure pulse can even reach a maximum value which is greater than the maximum ram pressure. However, this maximum value is reduced again to the maximum value of the ram pressure after switching through the switchover valve. Such an acceleration of the ram pressure buildup is shown in FIG. 6. In this diagram, time t is shown in the abscissa direction and ram pressure $p_s$ is shown in the ordinate direction. Curve 1 shows in a qualitative way how the ram pressure is built up. Curve 2 shows qualitatively the acceleration of the ram pressure buildup by a brief blocking of the switchover valve.

Figure 7:
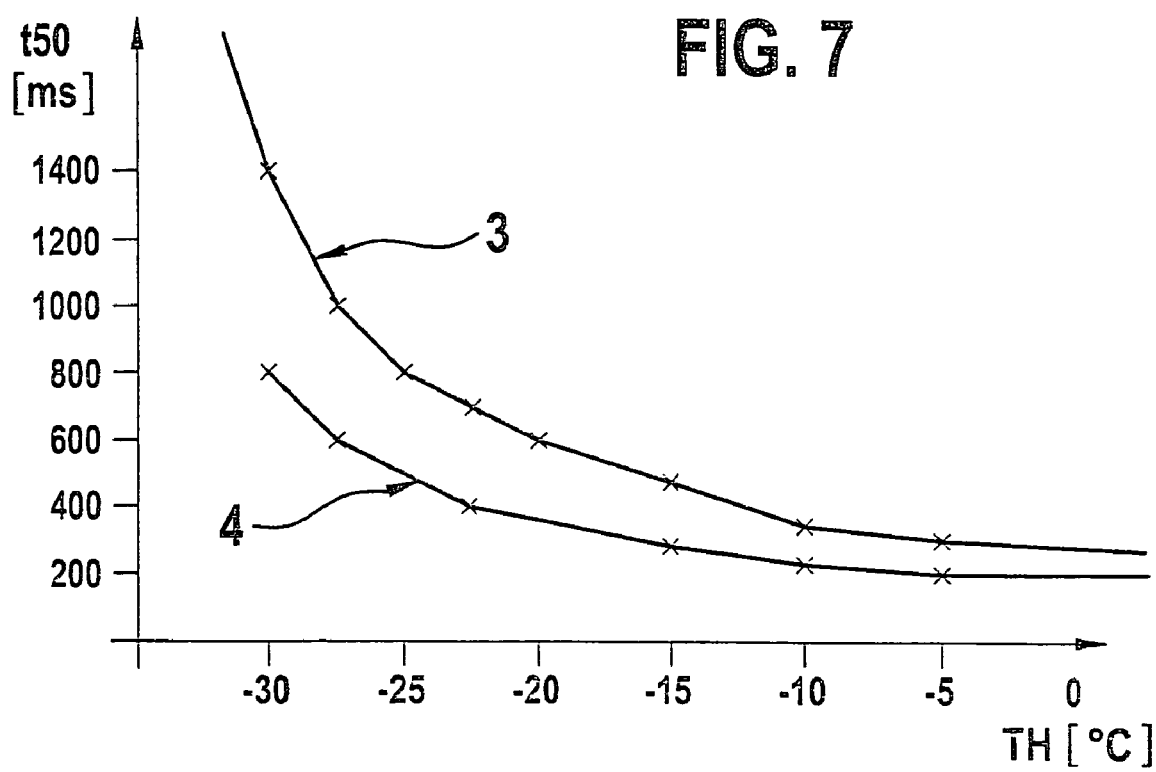
FIG. 7 is a chart showing a comparison of the pressure buildup times to 50 bar wheel brake pressure plotted against the temperature of the hydraulic control device.

FIG. 7 shows a comparison of the pressure buildup time to 50 bar wheel brake pressure (t50), plotted against the temperature of the hydraulic control device (TH). In this context, in the ordinate direction (the y axis) time t50 is plotted in milliseconds. This is the time required for the buildup of a wheel braking pressure of 50 bar. In the abscissa direction (the x axis) there is plotted the temperature of hydraulic control device TH in degrees centigrade. Curve 3 shows the pattern without control intervention measures, and curve 4 shows the pattern with consideration of a brake preloaded with the ram pressure. The faster pressure buildup is obvious.

Figure 8:
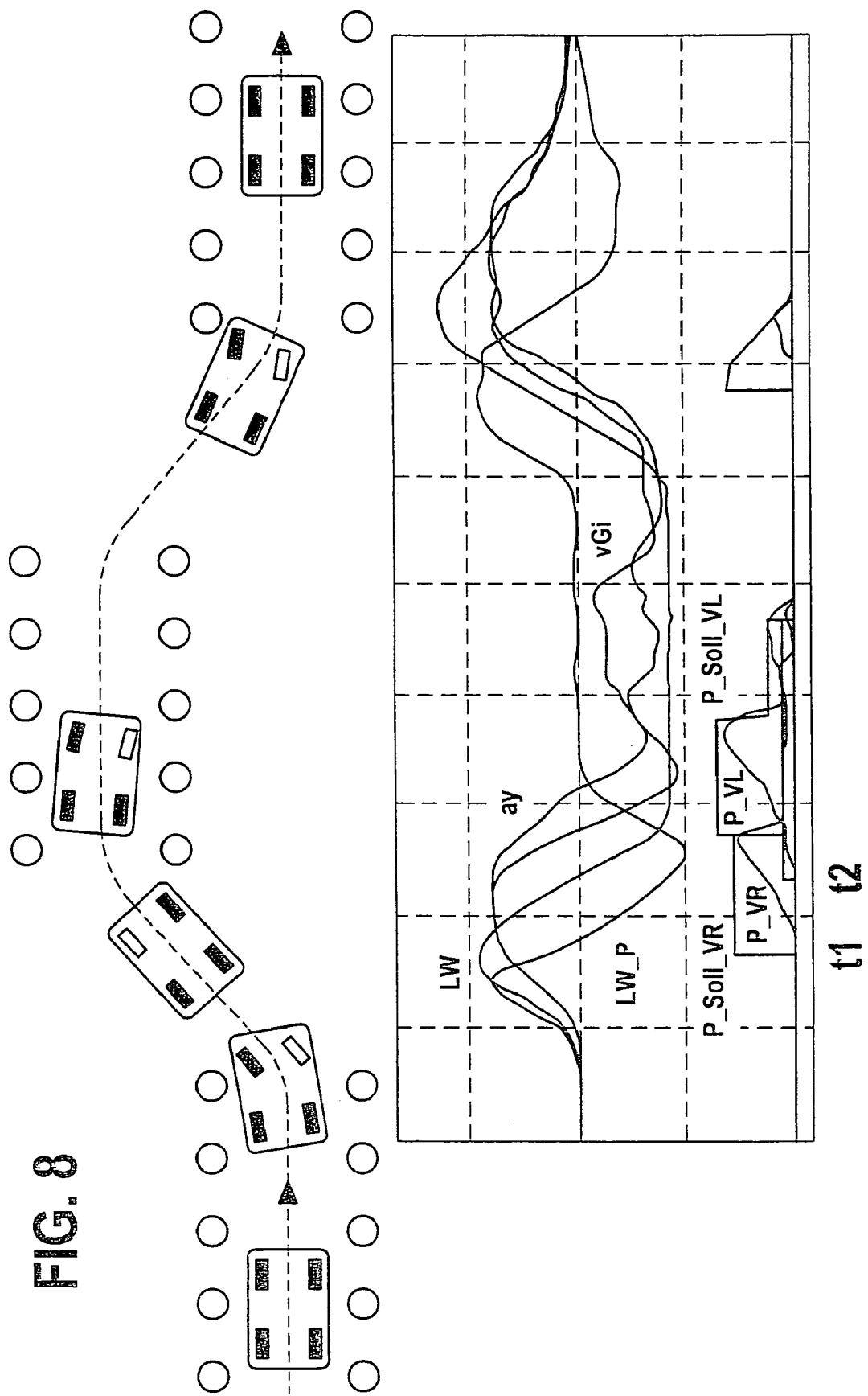
FIG. 8 shows the braking intervention pattern and the pressure pattern during a lane change maneuver.

Subsequently, in FIG. 8, the brake intervention pattern and the pressure pattern during a lane change maneuver are additionally shown. In this context, the VDA lane change maneuver is involved (VDA=Verband der deutschen Automobilindustrie (Association of the German Automobile Industry)). In the upper part of FIG. 8, the vehicle is shown in a top view during the driving maneuver. In each case, the wheel drawn in white is being braked. In the diagram in the lower part of FIG. 8, and more particularly in the upper part of the diagram, the curves of the steering angle, the transverse acceleration and the yaw rate are plotted. In the lower diagram, the curves of the setpoint pressure with time and the actual pressure at the right front wheel (P_setpoint_VR and P_VR), as well as the setpoint pressure and the actual pressure at the left front wheel (P_setpoint_VL and P_VL), are drawn in. At time t1 there begins the start of the pressure buildup at the right front wheel, and at the same time the beginning of the ram pressure logic at the left front wheel. At time t2 the direct pressure buildup at the left front wheel then takes place.

What is claimed is:

1. A device for controlling the brake system of a vehicle, comprising:
   at least two separate hydraulic brake circuits, each brake circuit including:
      a switchover valve, which is in a blocking setting when there is a braking intervention not actuated by the driver;
      a return pump;
      a high pressure switching valve, which is in a pass-through setting if a braking intervention is to be carried out in the brake circuit by activation of the return pump;
      a pair of inlet valves for a corresponding pair of wheel brakes; and
      a pair of discharge valves for a corresponding pair of wheel brakes; and
   a wheel slip control system for initiating a buildup of first braking moments at least one wheel brake upon fulfillment of selected conditions, and initiating preparatory measures for a buildup of second braking moments in wheel brakes of remaining wheels in reaction to the buildup of the first braking moments, wherein the preparatory measures lead to substantially no braking action in the wheel brakes of the remaining wheels, and wherein the preparatory measures for the buildup of the second braking moments include, in each of the two brake circuits: putting the return pump into operation, if the return pump is not already in operation; putting the inlet valves into a pass-through setting, if the inlet valves are not already in the pass-through setting; putting the discharge valves of the wheel brakes into a blocking setting, if the discharge valves are not already in the blocking setting; putting the switchover valve into the pass-through setting, if the switchover valve is not already in the pass-through setting; and putting the high pressure switching valve into the pass-through setting, if the high pressure switching valve is not already in the pass-through setting,
   wherein, as a result of the preparatory measures for the buildup of the second braking moments, the remaining wheel brake cylinders are prefilled.

2. The device according to claim 1, wherein the wheel slip control system is a vehicle dynamics control system.

3. The device according to claim 2, wherein the selected conditions for initiating a buildup of first braking moments include conditions which correspond to a potentially dangerous state with respect to driving stability, the potentially dangerous state with respect to driving stability being characterized by deviation of at least one variable influencing the driving dynamics by at least a predefined value from a setpoint value.

4. The device according to claim 1, wherein the first braking moments act to increase driving stability.

5. The device according to claim 1, further comprising:
   an environmental sensing system for providing signals relating to at least vehicle speed and distance to other vehicles, wherein a speed control and a distance control for the vehicle are carried out based on the signals, and wherein the signals provided by the environmental sensing system are utilized for determining whether the selected conditions for initiating the buildup of first braking moments have been satisfied.

6. The device according to claim 5, wherein the environmental sensing system includes at least one of radar, lidar and video.

7. A method for controlling the braking system of a vehicle equipped with a wheel slip control system, comprising:
   initiating a buildup of first braking moments at least one wheel brake upon fulfillment of selected conditions; and
   initiating, in response to the initiating of the buildup of the first braking moments, preparatory measures for a buildup of second braking moments in wheel brakes of remaining wheels, wherein the preparatory measures lead to substantially no braking action in the wheel brakes of the remaining wheels, and wherein the preparatory measures for the buildup of the second braking moments include, in each of the two brake circuits:
      putting a return pump into operation, if the return pump is not already in operation;
      putting inlet valves of the wheel brakes into a pass-through setting, if the inlet valves are not already in the pass-through setting;
      putting discharge valves of the wheel brakes into a blocking setting, if the discharge valves are not already in the blocking setting;
      putting a switchover valve into the pass-through setting, if the switchover valve is not already in the pass-through setting, the switchover valve being in the blocking setting when there is a braking intervention not actuated by the driver; and putting a high pressure switching valve into the pass-through setting, if the high pressure switching valve is not already in the pass-through setting, wherein, as a result of the preparatory measures for the buildup of the second braking moments, the remaining wheel brake cylinders are prefilled.

* * * * *